United States Patent Office 3,437,587
Patented Apr. 8, 1969

3,437,587
MOLECULAR SIEVE CATALYST
Henry George Ellert and William Judson Mattox, Baton Rouge, La., assignors to Esso Research and Engineering Company, a corporation of Delaware
No Drawing. Filed Nov. 29, 1961, Ser. No. 155,859
Int. Cl. C10g *13/02;* B01j *11/06*
U.S. Cl. 208—120
39 Claims The present invention relates to the improvement in catalytic conversion of hydrocarbons. More particularly, the present invention relates to the upgrading of hydrocarbon streams in the presence of a composition which is at once a powerful highly selective adsorbent and a hydrocarbon conversion catalyst. Still more particularly, the present invention relates to an improved catalyst and process for eliminating normal paraffin hydrocarbons from oils in which they are present by contacting such oils with a modified metallic alumino-silicate crystalline zeolite having uniform pore openings.

It is well known to improve the quality of hydrocarbon streams by catalytic treatment under various operating conditions to effect such reactions as cracking, hydrocracking, reforming, hydroforming, isomerization, polymerization, hydroisomerization, alkylation, hydrogenation, dehydrogenation, to name but a few. For example, it is well known to treat petroleum oils boiling in the range of about 400° to 1000° F. with a silica-alumina or a silica-magnesia catalyst at temperatures in the range of about 600° to 1100° F. to crack these oils and obtain valuable fractions suitable as motor fuels. It is also known that synthetic porous solids, comprising silica and one or more metallic oxides, such as magnesia, beryllia, zirconia and the like, have catalytic properties for the treatment of petroleum hydrocarbons. Natural and synthetic zeolites also have been found to have catalytic properties.

An important problem in catalytic conversions generally is the fact that rarely are there feeds available to which the catalyst is ideally suited. Many feeds contain, to a greater or less extent, impurities and components which are adversely affected by the catalyst and cause formation of secondary reaction products. For example, cracking a paraffinic stream to improve its octane value results in the destruction, to some extent, of branched chain components of this stream. Numerous other examples may be named.

Because of their low octane value in gasolines and their adverse effect upon the pour and cloud point of hydrocarbon oils generally, normal paraffins are undesirable in high octane gasolines, aviation turbo-jet fuels, kerosines, heating oils, lubricating oils and other premium quality petroleum products. Recognition of this fact has spurred efforts to develop processes which not only will permit the removal of normal paraffins from oils intended for use in the manufacture of such products, but also to convert them into useful products.

Recently a highly effective hydrocarbon separation tool has become available in the form of molecular sieves, which are natural or synthetic crystalline adsorbents of the zeolite family having the property of selectively adsorbing molecules in accordance with their molecular cross section or size. These sieves have pore openings of uniform size and will adsorb molecules having cross sectional areas equal to or smaller than this size, but exclude larger diameter materials. Among the natural crystalline zeolites having this molecular sieve property are chabazite and analcite. An excellent synthetic zeolite having a pore diameter of about 4 Angstrom units is described in a patent to Milton, U.S. 2,882,243, and is prepared by heating sodium silicate and sodium aluminate until the gel initially formed is crystallized to form a product corresponding to $Na_2O \cdot Al_2O_3 \cdot 2SiO_2 \cdot NH_2O$. This material, on dehydration, has a pore diameter of 4 Angstroms, too small to admit any but very low molecular weight hydrocarbons. On base exchange with an alkaline earth metal salt, such as a $CaCl_2$ solution, the pore openings are widened to about 5 Angstroms. This zeolite, on activation by calcination in air at a temperature of about 700° to 1000° F., is highly selective for adsorbing straight chain paraffins and olefinic hydrocarbons and substituted hydrocarbons, and substantially completely excludes branched chain and cyclic hydrocarbons.

It has further been found that these sieves have catalytic properties as well. Thus they will polymerize olefins and, at elevated temperatures, will act as cracking catalysts; because of their large surface area and uniform pore size, it would appear they would be ideally suited for the selective conversion of straight chain hydrocarbon into smaller fragments by catalytic cracking.

However, desirous as it is to employ these 5 Angstrom sieves in cracking and other catalytic reactions, their use has caused certain problems, mainly as a result of the non-selective nature of the catalytic effect. For instance, when they are employed in cracking a mixture of straight chain and branched chain hydrocarbons, a substantial amount of the latter was also cracked. This in effect degraded the final product, because high octane branched chain hydrocarbons were degraded.

It has been found that the catalytic activity of a 5 Angstrom molecular sieve is exerted both on the inner and outer surface of the sieve. The activity of the inner surface is selective to those molecules of cross section small enough to penetrate the sieve pores; however, the outer surface of the molecule exerts a non-selective catalytic action on molecules of all sizes found in the feed, thus accounting for the degradation of molecules that could not enter the sieve pores.

It has now been found that it is possible to treat sieve catalysts in a manner that substantially decreases the external surface catalytic effect without substantially decreasing, and, in fact, in some cases enhancing the catalytic effect of the internal surface or "cage" of the sieve. By treating the sieve in accordance with the process of the invention, it is now made possible to employ the sieve in catalytic reactions without first purifying the feed to remove degradable constituents, a laborious and possibly economically prohibitive operation.

In accordance with the present invention the sieve is subjected to a pretreatment step which effectively "poisons" the external surface catalytic activity of the sieve, without substantially affecting the selective internal catalytic activity thereof. In one embodiment of the present invention, the sieve is treated at relatively mild conditions with steam or water prior to its use as a catalyst. In another embodiment it was found that pretreatment of a sieve with nitrogen compounds and acidic gases such as $H_2S$ served to deactivate the external surface activity but not the internal surface activity. In still another embodiment, external surface catalystic activity is decreased by depositing on the outer surface an alkaline or alkaline earth metal oxide, either by aqueous or non-aqueous liquid impregnation or by treatment with an organometallic compound which is subsequently decomposed by heat or other suitable means. In this embodiment of the invention it is important, of course, to employ a compound having dimensions prohibiting its entry to the internal cage surface.

The catalytic processes that may be carried out by the modified catalyst of the present invention are numerous, but the catalyst of the present invention is particularly adapted to upgrade straight chain hydrocarbon streams admixed with non-straight chain compounds. Thus, besides increasing octane ratings of straight chain-branched chain naphthas, a waxy straight chain paraffin may be simultaneously separated from a heating oil and selectively cracked, hydrocracked or isomerized to improve the flow characteristics of the oil. Similarly, straight chain paraffins may be removed from turbojet fuels, kerosines, lube oils, etc.

The process of the present invention may be further understood when considered with the following illustrative examples.

EXAMPLE 1

The calcium form of a 5 Angstrom sieve was placed in about twice its weight of water and maintained at 212° F. for 16 hours. The water was then decanted, the sieve dried and calcined for 16 hours at 1000° F. The activated sieve was thereafter employed in hydrocracking a mixture of 52% normal hexane and 48% 3-methylpentane. The reaction conditions included 1000° F. temperature, a feed rate of 0.5 v./v./hr.; pressure of 100 p.s.i.g. and a hydrogen feed of 5,000 s.c.f./barrel. It will be observed that the water treatment selectively "poisoned" the external surface (as measured by the 3-methylpentane conversion) without significantly affecting the internal catalytic activity.

| Sieve treat | None | $H_2O$ |
|---|---|---|
| n-Hexane conversion, wt. percent | 65.0 | 60.8 |
| 3-methylpentane conversion, wt. percent | 16.9 | 4.8 |
| Total feed conversion, wt. percent | 41.9 | 33.9 |
| Reduction in n-hexane conversion, percent | | 6.5 |
| Reduction in 3-methylpentane conversion, percent | | 71.0 |

It is of interest to note that the sieves were originally prepared by crystallization from an aqueous medium and activated by calcination prior to the aqueous deactivation step of the present invention.

The water deactivation may be carried out at temperatures ranging from 150° F. to about 320° F. Shorter times are used at the higher temperatures. When superheated steam is employed, contact time must be limited to periods shorter than result in destruction of the sieve-cage structure. The amount of water used in the treat is not critical so long as sufficient is supplied to react with, or act upon, the active sites of the external surface.

EXAMPLE 2

A mixture of 52% n-hexane and 48% 3-methylpentane was hydrocracked at 1000° F., 100 p.s.i.g., 0.5 v./v./hr. with 5000 s.c.f./b. added $H_2$. The catalysts compared were calcium form 5 A. sieve, $H_2S$ and $NH_3$ treated (for 1 hr. at 1000° F. followed by 30 min. $H_2$ purge) calcium 5 A. sieve and Ca 5 A. sieve which had been exposed to 0.25 volume of quinoline at 1000° F., 0 p.s.i.g., and 1 v./v./hr.

| Sieve treat | None | $H_2S$ | $NH_3$ | Quinoline |
|---|---|---|---|---|
| n-Hexane conv., wt. percent | 65.0 | 76.7 | 71.0 | 70.0 |
| Percent increase due to treat | | 18.0 | 9.2 | 7.7 |
| 3-methylpentane conv., wt. percent | 16.9 | 6.0 | 11.9 | 12.5 |
| Percent decrease due to treat | | 64.5 | 29.6 | 26.0 |

While the results shown here were obtained using sieves which had been deactivated by treatment with reagent at 1000° F., lower temperatures, e.g. 400° to 800° F., can be employed, provided the system pressure and/or the length of treat is adjusted to allow extensive reaction of the treating agent with the catalytic sites. Furthermore, for convenience of operation the treats may be carried out using a solution of the treating agent in an inert diluent.

These results clearly demonstrate the improved activity and selectivity for n-paraffin cracking obtainable by the practice of the present invention. With these reagents not only is the non-selective catalytic activity of the external surface substantially diminished but the internal (selective) catalyst activity significantly enhanced.

Other reagents which may be employed to inhibit selectively the activity of the external surface include mercaptans, thiophenols, sulfur heterocyclics, alkyl and aryl amines, and various organic cyclic compounds which contain one or more nitrogen atoms as a component of the ring structure.

EXAMPLE 3

In this example a calcium form 5 A. molecular sieve was impregnated with an aqueous solution of sodium benzoate, dried and calcined for 16 hrs. at 1000° F. to give a modified sieve containing about 2 wt. percent $Na_2O$, mainly on the external surface. Some deposition undoubtedly will occur on the internal surface as well since, while sodium benzoate could not enter the small cage opening, a certain concentration of sodium ions was available. This could be avoided, for example, by the use of a non-polar solvent. Nevertheless, the following comparison of this sieve with the untreated sieve for hydrocracking clearly shows a pronounced reduction of the relative cracking activity of the external surface.

Feed: 52% n-hexane, 48% 3-methylpentane
Conditions: 1,000° F., 0.5 v./v./hr., 100 p.s.i.g., 5,000 s.c.f./b. $H_2$

| Sieve treat | None | Na benzoate |
|---|---|---|
| n-Hexane conversion, wt. percent | 65.0 | 50.6 |
| 3-methylpentane conversion, wt. percent | 16.9 | 9.6 |
| Total feed conversion, wt. percent | 41.9 | 30.9 |
| Reduction in n-hexane conversion, percent | | 22.1 |
| Reduction in 3-methylpentane conversion, percent | | 44.2 |

These data show that the sodium benzoate treatment decreased the activity of the external surface (as measured by 3-methylpentane conversion) by twice as much as it decreased the activity of the internal surface. Even more pronounced effects are obtained when ionization and/or size effects are tailored to the desired result, and when the amount of sodium deposited essentially corresponds to the stoichiometric equivalent of catalytic sites on the external surface.

The process of the present invention may be subject to many modifications within the scope of those skilled in the art. Instead of a calcium sieve the zeolite may be base exchanged or otherwise composited with other cations, such as nickel, iron, cobalt, magnesium, palladium, platinum, chromium and the like, thereby imparting catalytic properties associated with those cations.

Though the process of the present invention has been described mainly in connection with deactivating 5 Angstrom molecular sieves, it is to be understood that sieves having smaller or larger size pore openings, from 3 to 15 Angstrom units, and having both selective and non-selective catalyst activity may be treated to decrease their non-selective catalytic effect. Furthermore, the deactivation of the non-selective catalytic activity of the sieve may be achieved during the catalysis itself by adding the reagent to the feed. This technique is particularly suitable for maintaining the low activity of the external surface for extended periods of time.

What is claimed is:

1. A process for preparing a highly selective crystalline molecular sieve catalyst which comprises contacting a crystalline metalloalumino silicate zeolitic molecular sieve having uniform pore openings and exerting catalytic activity both on the outer surface of said sieve, as well as on the inner surface within the pores of said sieve with a reagent selected from the group consisting of steam and water at a temperature of from about 150 to about 320° F. for a period of time sufficient to selectively decrease the catalytic activity of the outer surface of said sieve and recovering a sieve of enhanced selective catalytic activity.

2. The process of claim 1 wherein said sieve has uniform pore openings of about 5 Angstroms and said reagent is water.

3. The process of claim 1 wherein said sieve has uniform pore openings of about 5 Angstroms and said reagent is steam.

4. A process for preparing a highly selective 5 Angstrom molecular sieve catalyst which comprises contacting a crystalline metalloalumino silicate zeolitic molecular sieve having uniform pore openings of about 5 Angstroms and exerting catalytic activity both on the outer surface of the sieve, as well as on the inner surface within the pores of said sieve, at a temperature of about 212° F. with a sufficient quantity of water to selectively decrease the catalytic activity of the outer surface of said sieve and recovering a 5 Angstrom zeolitic molecular sieve having enhanced selective catalytic activity.

5. A process for preparing a highly selective 5 Angstrom molecular sieve catalyst which comprises contacting a crystalline metalloalumino silicate zeolitic molecular sieve having uniform pore openings of about 5 Angstroms and exerting catalytic activity both on the outer surface of said sieve, as well as on the inner surface within the pores of said sieve with a reagent selected from the group consisting of sulfur compounds at a temperature between 400 and 1000° F. for a period sufficient to selectively decrease the catalytic activity of the outer surface of said sieve and recovering a crystalline zeolitic 5 Angstrom molecular sieve having enhanced selective catalytic activity.

6. A process for preparing a highly selective 5 Angstrom molecular sieve catalyst which comprises contacting a crystalline metalloalumino silicate zeolitic molecular sieve having uniform pore openings of about 5 Angstroms and exerting catalytic activity both on the outer surface of said sieve, as well as on the inner surface within the pores of said sieve with a metallic compound selected from the group consisting of alkali metal oxides and alkaline earth metal oxides under conditions to selectively decrease the catalytic activity of the outer surface of said sieve and recovering a zeolitic 5 Angstrom molecular sieve of enhanced selective catalytic activity.

7. A process for preparing a highly selective 5 Angstrom molecular sieve catalyst which comprises contacting a crystalline metalloalumino silicate zeolite molecular sieve having uniform pore openings of about 5 Angstroms and exerting catalytic activity both on the outer surface of said sieve, as well as on the inner surface within the pores of said sieve with a quantity of sodium oxide sufficient to selectively decrease the catalytic activity of the outer surface of said sieve and recovering a zeolitic 5 Angstrom molecular sieve having enhanced selective catalytic activity.

8. A process for preparing a highly selective 5 Angstrom molecular sieve catalyst which comprises contacting a crystalline metalloalumino silicate zeolitic molecular sieve having uniform pore openings of about 5 Angstroms and exerting catalytic activity both on the outer surface of said sieve, as well as on the inner surface within the pores of said sieve with an alkali metal organic compound at elevated temperatures, said compound being capable of being converted into the corresponding alkali metal oxide at said elevated temperatures, and recovering a zeolitic 5 Angstrom molecular sieve wherein the outer surface catalytic activity has been selectively decreased.

9. The process of claim 8 wherein said alkali metal organic compound is sodium benzoate.

10. A process for the conversion of a hydrocarbon charge stock under catalytic cracking conditions with a 5 Angstrom zeolitic molecular sieve catalyst, said molecular sieve catalyst having been prepared by contacting a crystalline metalloalumino silicate zeolitic molecular sieve having uniform pore openings of about 5 Angstrom and exerting catalytic activity both on the outer surface of said sieve, as well as on the inner surface within the pores of said sieve with a reagent selected from the group consisting of steam and water at a temperature between about 150° and about 320° F. for a period sufficient to selectively decrease the catalytic activity of the outer surface of said sieve.

11. A process for the conversion of a hydrocarbon charge stock under hydrocracking conditions with a 5 Angstrom zeolitic molecular sieve catalyst, said molecular sieve catalyst having been prepared by contacting a crystalline metalloalumino silicate zeolitic molecular sieve having uniform pore openings of about 5 Angstroms and exerting catalytic activity both on the outer surface of said sieve, as well as on the inner surface within the pores of said sieve with a reagent selected from the group consisting of steam and water at a temperature between about 150° and about 320° F. for a period sufficient to selectively decrease the catalytic activity of the outer surface of said sieve.

12. A process for the conversion of a hydrocarbon charge stock under hydrocracking conditions in the presence of a 5 Angstrom zeolitic molecular sieve catalyst which has been prepared by contacting a crystalline metalloalumino silicate zeolitic molecular sieve having uniform pore openings of about 5 Angstroms and exerting catalytic activity both on the outer surface of said sieve, as well as on the inner surface within the pores of said sieve with a reagent selected from the group consisting of alkali metal oxides and alkaline earth metal oxides at elevated temperatures and for a time sufficient to selectively decrease the catalytic activity of the outer surface of said sieve.

13. A process for the conversion of a hydrocarbon charge stock under hydrocracking conditions in the presence of a 5 Angstrom zeolitic molecular sieve catalyst which was prepared by contacting a crystalline metalloalumino silicate zeolitic molecular sieve having uniform pore openings of about 5 Angstroms and exerting catalytic activity both on the outer surface of said sieve, as well as on the inner surface within the pores of said sieve with $H_2S$ at a temperature between about 400° and 1000° F. for a period sufficient to selectively decrease the catalytic activity of said outer surface of said sieve.

14. A process for preparing a highly selective crystalline molecular sieve catalyst which comprises contacting a crystalline metalloalumino silicate zeolitic molecular sieve having uniform pore openings and exerting catalytic activity on both the outer surface of the sieve and the inner surface within the pores of the sieve with hydrogen sulfide under conditions whereby the outer surface catalytic activity is selectively decreased, and thereafter recovering a crystalline zeolitic molecular sieve of enhanced selective catalytic activity.

15. A process for preparing a highly selective crystalline molecular sieve catalyst which comprises contacting a crystalline metalloalumino silicate zeolitic molecular sieve having uniform pore openings of about 5 Angstroms and exerting catalytic activity both on the outer surface of said sieve and on the inner surface within the pores of said sieve with hydrogen sulfide for a sufficient period of time to selectively decrease the catalytic activity of the outer surface of said sieve, and thereafter recovering a crystalline zeolitic 5 Angstrom molecular sieve having enhanced selective catalytic activity.

16. A process for preparing a highly selective crystalline molecular sieve catalyst which comprises contacting a crystalline metalloalumino silicate zeolitic molecular sieve having uniform pore openings and exerting catalytic activity both on the outer surface of said sieve and the inner surface within the pores of said sieve, with ammonia for a period of time sufficient to selectively decrease the catalytic activity of the outer surface of said sieve, and thereafter recovering a sieve having enhanced selective catalytic activity.

17. A process for preparing a highly selective crystalline molecular sieve catalyst which comprises contacting a crystalline metalloalumino silicate zeolitic molecular sieve having uniform pore openings of about 5 Angstroms and exerting catalytic activity both on the outer surface of said sieve and the inner surface within the pores of said sieve with ammonia for a period of time sufficient to selectively decrease the catalytic activity of the outer surface of said sieve, and thereafter recovering a crystalline zeolitic 5 Angstrom molecular sieve having enhanced selective catalytic activity.

18. A method for effecting transformation of organic compounds, catalytically convertible in the presence of acidic catalyst sites, which comprises contacting the same under conversion conditions with a catalyst of a crystalline metal aluminosilicate which has undergone contact prior to completion of said transformation with hydrogen sulfide in an amount sufficient to effectively enhance the activity of said catalyst, which catalyst is characterized by a uniform pore structure.

19. A method for cracking a hydrocarbon charge which comprises contacting the same under catalytic cracking conditions with a catalyst of a crystalline metal alumino-silicate which has undergone contact prior to completion of said cracking with hydrogen sulfide present in an amount sufficient to effectively enhance the activity of said catalyst, which catalyst is characterized by a uniform pore structure.

20. A method for cracking a normally paraffinic hydrocarbon which comprises contacting the same under catalytic cracking conditions with a catalyst of a crystalline metal aluminosilicate which has undergone contact prior to completion of said cracking with hydrogen sulfide present in an amount sufficient to effectively enhance the activity of said catalyst, which catalyst is characterized by a uniform pore structure.

21. A method for effecting transformation of organic compounds, catalytically convertible in the presence of acidic catalyst sites, which comprises contacting the same under conversion conditions with a crystalline alkaline earth metal aluminosilicate catalyst, which catalyst has undergone contact prior to completion of said transformation with hydrogen sulfide present in an amount sufficient to effectively enhance the activity of said catalyst, which catalyst is characterized by a uniform pore structure.

22. A method for effecting transformation of organic compounds, catalytically convertible in the presence of acidic catalyst sites, which comprises contacting the same under conversion conditions with a crystalline metal aluminosilicate catalyst, which catalyst has undergone contact prior to completion of said transformation with hydrogen sulfide present in an amount sufficient to effectively enhance the activity of said catalyst, which catalyst is characterized by a uniform pore structure made up of pores of between about 3 and 15 Angstrom units in diameter.

23. A method for effecting transformation of organic compounds, catalytically convertible in the presence of acidic catalyst sites, which comprises contacting the same under conversion conditions with a catalyst of a crystalline metal aluminosilicate having pores normally incapable of penetration by said organic compounds, which catalyst has undergone contact prior to completion of said transformation with hydrogen sulfide present in an amount sufficient to effectively enhance the activity of said catalyst, which catalyst is characterized by a uniform structure made up of pores of between about 3 and about 5 Angstrom units in diameter.

24. A method for effecting transformation of organic compounds, catalytically convertible in the presence of acidic catalyst sites, which comprises contacting the same under conversion conditions with a catalyst of a crystalline metal aluminosilicate which has undergone pretreatment with hydrogen sulfide present in an amount sufficient to effectively enhance the activity of said catalyst, which catalyst is characterized by a uniform pore structure.

25. A method for effecting transformation of organic compounds, catalytically convertible in the presence of acidic catalyst sites, which comprises passing the same through a reaction zone containing a catalyst of a crystalline metal aluminosilicate, maintained under conversion conditions, introducing into and maintaining during transformation in said reaction zone hydrogen sulfide present in an amount sufficient to effectively enhance the activity of said catalyst, which catalyst is characterized by a uniform pore structure.

26. A process for enhancing the selectivity of a crystalline molecular sieve catalyst having uniform pore openings which comprises selectively deactivating the external surface activity of said catalyst by treatment with a basic nitrogen compound.

27. A process for enhancing the selectivity of a crystalline molecular sieve catalyst having uniform pore openings which comprises selectively deactivating the external surface activity of said catalyst by treatment with a sulfur compound.

28. A process for enhancing the selectivity of a crystalline molecular sieve catalyst having uniform pore openings which comprises selectively deactivating the external surface activity of said catalyst by treatment with a reagent selected from the group of compounds consisting of (a) the alkali metal oxides and (b) the alkaline earth metal oxides.

29. A process for enhancing the selectivity of a crystalline molecular sieve catalyst having uniform pore openings which comprises selectively deactivating the external surface activity of said catalyst by treatment with an alkali metal organic compound.

30. The process of claim 26 wherein said crystalline molecular sieve catalyst has uniform pore openings of about 5 A.

31. The process of claim 27 wherein said crystalline molecular sieve catalyst has uniform pore openings of about 5 A.

32. The process of claim 28 wherein said crystalline molecular sieve catalyst has uniform pore openings of about 5 A.

33. The process of claim 29 wherein said crystalline molecular sieve catalyst has uniform pore openings of about 5 A.

34. A process for preparing a highly selective 5 A. molecular sieve catalyst which comprises contacting a crystalline metallo-aluminosilicate zeolitic molecular sieve having uniform pore openings of about 5 A. and exerting catalytic activity both on the outer surface of said sieve, as well as on the inner surface within the pores of said sieve with a reagent selected from the group consisting of basic nitrogen compounds at a temperature between 400 and 1000° F. for a period sufficient to selectively decrease the catalytic activity of the outer surface of said sieve and recovering a crystalline zeolitic 5 A. molecular sieve having enhanced selective catalytic activity.

35. A hydrocarbon conversion process which comprises contacting a hydrocarbon charge stock under hydrocarbon conversion conditions with a crystalline zeolitic molecular sieve catalyst, which catalyst has been contacted with a reagent selected from the group consisting of steam and water at a temperature between about 150° and about 320° F.

36. A hydrocarbon conversion process which comprises contacting a hydrocarbon charge stock under hydrocarbon conversion conditions with a crystalline zeolitic molecular sieve catalyst, which catalyst has been contacted with a basic nitrogen compound under conditions whereby the outer surface catalytic activity of said sieve has been selectively decreased.

37. A hydrocarbon conversion process which comprises contacting a hydrocarbon charge stock under hydrocarbon conversion conditions with a crystalline zeolitic molecular sieve catalyst, which catalyst has been contacted with a sulfur compound under conditions whereby the outer surface catalytic activity of said sieve has been selectively decreased.

38. A hydrocarbon conversion process which comprises contacting a hydrocarbon charge stock under hydrocarbon conversion conditions with a crystalline zeolitic molecular sieve catalyst, which catalyst has been contacted with a reagent selected from the group consisting of the alkali metal oxides and the alkaline earth metal oxides under conditions whereby the outer surface catalytic activity of said sieve has been selectively decreased.

39. A hydrocarbon conversion process which comprises contacting a hydrocarbon charge stock under hydrocarbon conversion conditions with a crystalline zeolitic molecular sieve catalyst, which catalyst has been contacted with an alkali metal organic compound under conditions whereby the outer surface catalytic activity of said sieve has been selectively decreased.

References Cited

UNITED STATES PATENTS

| | | | |
|---|---|---|---|
| 3,033,778 | 5/1962 | Frilette et al. | 208—120 |
| 3,140,249 | 7/1964 | Plank et al. | 208—120 |
| 2,916,437 | 12/1959 | Gilbert | 252—455 X |
| 2,962,435 | 11/1960 | Fleck et al. | 252—454 X |
| 2,981,676 | 4/1961 | Adams et al. | 252—411 |
| 2,982,719 | 5/1961 | Gilbert et al. | 252—455 X |

DELBERT E. GANTZ, *Primary Examiner*.

T. H. YOUNG, *Assistant Examiner*.

U.S. Cl. X.R.

252—455